United States Patent [19]
Bruning

[11] 3,980,124
[45] Sept. 14, 1976

[54] GRAIN DOOR AND METHOD OF INSTALLATION

[75] Inventor: William E. Bruning, Omaha, Nebr.

[73] Assignee: Omni Corporation, Omaha, Nebr.

[22] Filed: June 10, 1974

[21] Appl. No.: 477,702

[52] U.S. Cl. .................. 160/368 G; 160/368 R; 229/31 R
[51] Int. Cl.² .................. A47H 3/00; B65D 5/24
[58] Field of Search ............. 160/368 G; 229/31 R

[56] References Cited
UNITED STATES PATENTS

| | | | |
|---|---|---|---|
| 2,966,438 | 12/1960 | Ford | 160/368 G |
| 3,224,496 | 12/1965 | Bruning | 160/368 G |
| 3,367,555 | 2/1968 | Montgomery | 229/31 R |

*Primary Examiner*—Paul R. Gilliam
*Assistant Examiner*—Victor N. Sakran
*Attorney, Agent, or Firm*—Dawson, Tilton, Fallon & Lungmus

[57] ABSTRACT

A grain door for installation across the doorway of a boxcar wherein a generally rectangular relatively stiff panel equipped with a plurality of horizontal straps is equipped with diagonal fold lines extending from the intersection of the side flap and floor flap fold lines to permit folding the side flaps and the floor flaps ends into overlying relation with the remainder of said panel to facilitate anchoring the straps to the doorway posts.

1 Claim, 6 Drawing Figures

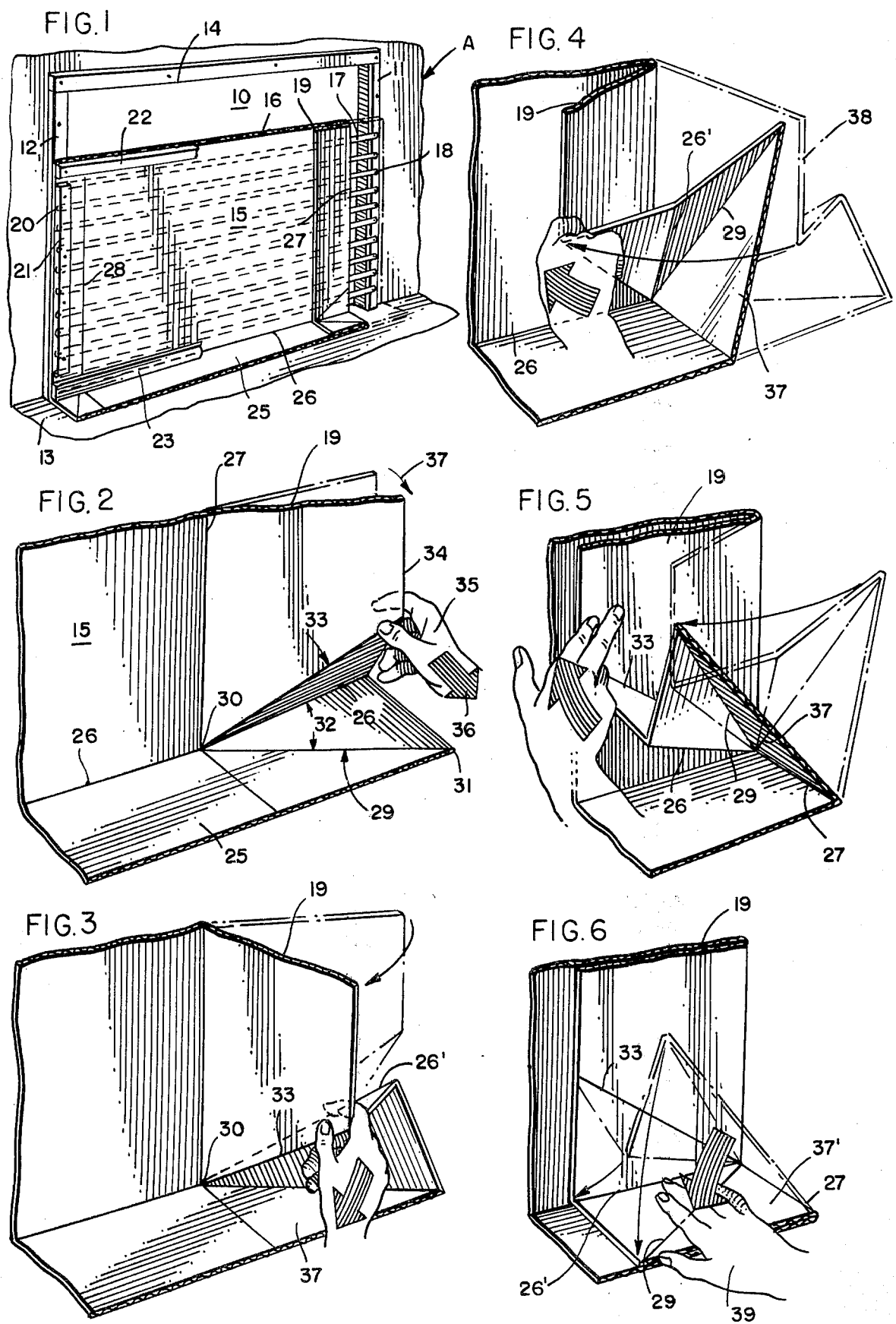

GRAIN DOOR AND METHOD OF INSTALLATION

BACKGROUND AND SUMMARY OF INVENTION

For many years grain has been carried in boxcars and for this purpose it is necessary to install temporary barriers across the boxcar doorways. It is apparent that if only the sliding stormdoors are utilized, the grain can leak out as soon as it is introduced. Therefore, the practice has long been followed of coopering a temporary door across the inside of the door posts. A preferred form of door incorporates horizontally extending metal straps which are nailed or otherwise anchored into the door posts and used as a basic support for a relatively stiff paperboard sheet — such as a corrugated paperboard. The sheet, or panel of paperboard necessarily must be wider than the doorway itself so as to prevent leakage along the sides, and hence the edge portions of the door panel have been equipped with fold lines — so as to develop side flaps exposing the metal straps for nailing into the door posts. After the nailing has been complete, the flaps are "unfolded" or positioned in generally planar relation with the rest of the door panel — such a construction being seen in U.S. Pat. No. 2,966,438.

In the past, the nailing operation (more particularly, the management of the side flaps) was onerous. When it is considered that there is a great deal of resiliency to the paperboard door, it can be appreciated that the artisan doing the nailing (or coopering) has had to fight the tendency of the side flap to spring back into its original position. Sometimes this has been solved by using two artisans — one holding the flap while the other does the nailing. On other occasions, the artisan would use a wire to hold the flap in its "fold back" condition. Any rough handling of the door, including the side flaps, can result in damage which could result to leakage of grain. The presence of grain external to the temporary door, i.e., on the sill of the boxcar, raises a suspicion in the mind of the recipient, or buyer — just how much has been lost? Therefore, it is highly desirable to make sure that the seal effected by the grain door is perfect.

Through the instant invention, I have solved both of these problems, alternatively, have provided two advantages through the provision of a single novel structure. The introduction of upwardly and downwardly diagonal fold lines from the intersection of the horizontal floor flap fold line and the vertical side flap fold line makes it possible for one artisan to conveniently fold the side flap back and without the need for applying any damage-inducing stresses.

Other advantages of the invention may be seen in the ensuing detailed description.

DETAILED DESCRIPTION:

The invention is described in conjunction with an illustrative embodiment in the accompanying drawing, in which FIG. 1 is a fragmentary perspective view of the interior of a boxcar showing a grain door installed across the doorway opening;

FIG. 2 is an enlarged fragmentary perspective view of the lower right hand corner of the door (when viewed from the inside) and showing the temporary door configuration in the process of having the side flap folded upon the remainder of the door panel, the side flap being folded in this view approximately 10°;

FIG. 3 is a view similar to FIG. 2 but showing a subsequent stage in the folding and wherein the side flap has been folded about the fold line approximately 70°;

FIG. 4 is a view similar to FIGS. 2 and 3 and showing yet a further stage in the reverse folding, the side flap in this view having been reversely folded approximately 150°;

FIG. 5 is a view similar to FIGS. 2–4 and shows even a later stage in the development of the reverse folding of the side flap, here the side flap itself being reversely folded approximately 180°; and FIG. 6 is a view similar to FIGS. 2–5 and shows the completion of the reverse folding, i.e., where the bottom portion of the side flap has been overfolded or reversely folded into overlying relation with the remainder of the floor flap.

In the illustration given and with reference to FIG. 1, the symbol A generally designates a portion of a boxcar, more particularly, the doorway opening designated 10. The doorway opening 10 is defined by side posts 11 and 12, the floor 13 (providing a sill not shown) and the lintel or head 14. Disposed across the doorway 10 is a temporary door 50. A suitable door for this purpose is described in the application of William E. Bruning and Michael J. Ford, Ser. No. 389,951, filed Aug. 30, 1973. In that application, a door is described wherein a corrugated paperboard panel 16 is equipped with a plurality of horizontally extending flat metal straps 17 secured to the outer face of the panel 16. Alternatively, the straps 17 may be anchored to the panel 16 through the use of an overlying sheet of paper, such as is described in the previously mentioned U.S. Pat. No. 2,966,438.

Still referring to FIG. 1, it will be seen that the ends of the straps 17 are secured to the door post 11 as by nail 18. To expose the ends of the strap 17 for this operation, I reversely fold a side flap 19 (still referring to the right hand side of FIG. 1) and the structure and operation of the door for this purpose are described in conjunction with the remaining views of the drawing.

After the nailing has been completed, the flap 19 is "unfolded", i.e., returned to its original condition of being coplanar with the remainder of the panel and this is illustrated by the flap 20 at the left hand side of FIG. 1. After the nailing and unfolding has been achieved, it may be advantageous in some instances to install a side batten 21 to overlie the side flap in the area juxtaposed relative to the door post 12. Also, in some instances it is desirable to install a climb board 22 (to facilitate the entry of an artisan into the car for sampling) and a pry board 23 (for use by the artisan in prying open a sticking storm door). Further, the temporary door 15 includes an integral floor flap 25 which is seen to lie against the floor 13 and is defined as the portion below a horizontal fold line or scoring line 26. In like fashion, the side flaps 19 and 20 are defined by fold lines or lines of scoring (vertical in this instance) and designated by the numerals 27 and 28, respectively.

Turning now to FIG. 2, we see the lower right hand portion of the temporary door 15. The side flap 19 is in the process of being reversely folded about the vertical fold line 27. Also seen is the right hand portion of the floor flap 25 which is defined as that portion below the horizontal fold line, or line of scoring 26. For the practice of the invention, I provide two additional fold lines or lines of scoring. Still referring to FIG. 2, it will be seen that the first of these fold lines (designated generally by the numeral 29) extends in a direction which might be considered diagonally downward away from the point of intersection 30 of the vertical fold line 27 and the horizontal fold line 26. The downwardly diagonal fold line 29 extends from this point of intersection 30 to the lower most corner 31 of the door. As such, the line 29 forms an acute angle 32 with the horizontal fold line 26.

The other fold line employed in the practice of the invention is generally designated 33 and as can be readily appreciated from FIG. 2 extends essentially diagonally upwardly from the point of intersection 30 to the extreme edge or side 34 of the door panel, i.e., the right hand edge of the flap 19. The upwardly diagonal fold line 33 is disposed at approximately the same acute angle relative to the horizontal fold line 26 as is the fold line 29 — but on the other side of the fold line 26. The fold line 33 like the remaining fold lines 26–29 is advantageously developed by scoring of the corrugated paperboard medium making up the door 15. This can be done by conventional wheel scoring devices. In operation, however, the fold line 33 behaves differently, i.e., the reverse of the remaining fold lines. Each of the fold lines 26–29 developed what I term an "infold", i.e., the portion on at least one side of the fold line is folded inwardly in the operation contemplated. In contrast to this, the fold line 33 develops an "outfold".

In the practice of the invention, the artisan (whose hand is shown in FIG. 2 and designated by the numeral 35) grasps the portion of the door where the fold line 33 ends, i.e., where it intersects the side 34, and pulls inwardly — as illustrated by the arrow designated 36 in FIG. 2. The application of this simple force causes the portion of the side flap aboove the line 33 to pivot inwardly as designated by the arrow 37. In FIG. 2, the movement is stopped at a point where the inward movement of the side flap 19 is approximately 10° removed from coplanar relation with remainder of the door panel 15.

Still referring to FIG. 2, the inward movement of the side flap along the line 33 brings about a similar movement of the side flap in the area of the horizontal fold line 26, i.e., the portion designated 26'.

As the side flap 19 is pulled further inwardly — now referring to FIG. 3 — the fold line 26' is seen to have moved upwardly and inwardly while the fold line 33 has merely pivoted about the point of intersection 30. In FIG. 3, it will be noted that the portion 37 of the floor flap below the fold line 29 still remains in place on the floor 13.

In FIG. 3, the disposition of the flap 19 is at about 70° to the original position. FIG. 4 shows yet a later stage in the movement of the side flap 19 — it now having been pivoted or reversely folded about 150°. Also in FIG. 4, I show in phantom-line 38 the 70° configuration of the side flap, previously shown in solid line in FIG. 3. It will be noted in FIG. 4 that the triangular shaped portion 37 of the floor flap now has pivoted upwardly.

Turning now to FIG. 5, the side flap 19 has been completely reversely folded, i.e., pivoted 180° from its original condition. This is true also of the showing in FIG. 6 — the difference between FIGS. 5 and 6 being that in FIG. 6 the portion of the floor flap normally to the right or outboard of the fold line 27, has now been also reversely folded. In FIG. 5 the floor flap portion outward of the fold line 27 is in the process of being completely, reversely folded. If the innate resiliency of the door does not convert the arrangement from that of FIG. 5 to that of FIG. 6, it is only necessary to apply a slight hand pressure — as at 39 in FIG. 6 to bring the right hand end of the floor flap into overlying relation with the remainder of the floor flap. In this condition, the side flap is completely stable — there is no need to use any holding or stabilizing means to maintain it in the reversely folded condition and the artisan is free to go about his work of coopering the door.

The reverse process is used when all the nails are driven. The side flap and floor flap are returned to their original position for sealing off with a lathe or batten to prevent leakage. All that is necessary for this purpose is to grasp the side flap in the area where the fold line 33 intersects the side 34 and pull in the reverse direction whereupon the side flap and floor flap apportions to the right of the vertical scoring line 27 assume their usual positions.

I claim:

1. A grain door comprising a generally rectangular, relatively stiff panel having a plurality of horizontally extending metal straps adjacent one face thereof; a horizontally extending fold line adjacent the panel bottom adapted to develop a floor flap, a vertical fold line adjacent each side of said panel adapted to develop a side flap and intersecting said horizontal fold line, a downwardly diagonal fold line extending from each intersection to the adjacent bottom corner of said panel and forming an acute angle with said horizontal fold line, and an upwardly diagonal fold line extending from each intersection to the adjacent side and forming approximately the same acute angle with said horizontal fold line whereby, when said panel is installed across the doorway of a boxcar, inward force at the end of said upwardly diagonal fold line permits folding through an arc of 180° its associated side flap and floor flap end into overlying relation with the remainder of said panel.

* * * * *